US012706075B2

(12) United States Patent
Xiang et al.

(10) Patent No.: US 12,706,075 B2
(45) Date of Patent: Aug. 11, 2026

(54) VOICE MASKING METHOD, APPARATUS, AND SYSTEM, AND VEHICLE

(71) Applicant: YINWANG INTELLIGENT TECHNOLOGIES CO., LTD., Shenzhen (CN)

(72) Inventors: Teng Xiang, Shanghai (CN); Sheng Wu, Shanghai (CN); Guoli Ping, Dongguan (CN); Liming Shi, Shenzhen (CN); Pinxi Mo, Shanghai (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/356,437

(22) Filed: Oct. 13, 2025

(65) Prior Publication Data

US 2026/0038473 A1 Feb. 5, 2026

Related U.S. Application Data

(63) Continuation of application No. PCT/CN2023/088312, filed on Apr. 14, 2023.

(51) Int. Cl.
*G10K 11/175* (2006.01)
*G10L 21/0208* (2013.01)

(52) U.S. Cl.
CPC ................................ *G10K 11/1754* (2020.05)

(58) Field of Classification Search
CPC ........... G10K 11/1754; G10K 11/1752; G10K 11/175

(Continued)

(56) References Cited

U.S. PATENT DOCUMENTS

2011/0208516 A1 8/2011 Kuboyama
2015/0071455 A1* 3/2015 Tzirkel-Hancock .... G10L 15/20 381/86
2021/0354642 A1* 11/2021 Onodera ............ B60H 1/00371

FOREIGN PATENT DOCUMENTS

CN 105304089 A 2/2016
CN 109862472 A 6/2019

(Continued)

OTHER PUBLICATIONS

International Search Report and Written Opinion in International Appln. No. PCT/CN2023/088312, mailed on Dec. 16, 2023, 19 pages (with English translation).

(Continued)

*Primary Examiner* — Vivian C Chin
*Assistant Examiner* — Douglas J Suthers
(74) *Attorney, Agent, or Firm* — Fish & Richardson P.C.

(57) ABSTRACT

A voice masking method, apparatus, and system are provided, which are applicable to the field of intelligent vehicles. The method includes: determining a voice source location and a target masking location; receiving a sound signal from the voice source location, and detecting whether a voice signal exists in the sound signal, to generate a detection result; and if the detection result is that the voice signal exists in the sound signal, generating a masking sound for the voice signal, and outputting the masking sound to a first speaker at the voice source location and a second speaker at the target masking location; or if the detection result is that no voice signal exists in the sound signal, skipping generating the masking sound. According to this application, a requirement of an occupant for private voice communication in vehicle cockpit space can be met, and information security can be improved.

20 Claims, 8 Drawing Sheets

(58) Field of Classification Search
USPC .......................................................... 381/73.1
See application file for complete search history.

(56) References Cited

FOREIGN PATENT DOCUMENTS

| | | | |
|---|---|---|---|
| CN | 111731322 | A | 10/2020 |
| CN | 114056247 | A | 2/2022 |
| CN | 115831141 | A | 3/2023 |
| CN | 115910018 | A | 4/2023 |
| DE | 102014214053 | A1 | 1/2016 |

OTHER PUBLICATIONS

Extended European Search Report in European Appln. No. 23932495.7, mailed on May 18, 2026, 8 pages.

* cited by examiner

VOICE MASKING METHOD, APPARATUS, AND SYSTEM, AND VEHICLE

CROSS-REFERENCE TO RELATED APPLICATIONS

This application is a continuation of International Application No. PCT/CN2023/088312, filed on Apr. 14, 2023, the disclosure of which is hereby incorporated by reference in its entirety.

TECHNICAL FIELD

This application relates to the field of intelligent vehicles, and in particular, to a cockpit voice masking method, apparatus, and system, and a vehicle.

BACKGROUND

With development of vehicle intelligence, an intelligent cockpit is used as independent space, and both a driver and a passenger have a privacy protection requirement for voice communication content in the cockpit space. For example, in a business scenario, two parties of cooperation talk in a back row of the cockpit, but do not expect conversation content to be known to a driver or a passenger in a front row; or when a driver is in a call with another person, the driver does not expect call content to be known to another passenger in a vehicle. In the foregoing scenarios, how to avoid privacy or information leakage caused by a voice of an occupant becomes a problem that needs to be resolved.

SUMMARY

This application provides a voice masking method, apparatus, and system, and a vehicle, to meet a requirement of an occupant for private voice communication in vehicle cockpit space, so as to improve information security.

According to a first aspect, this application provides a voice masking method, applied to a vehicle. The method includes:

determining a voice source location and a target masking location; receiving a sound signal from the voice source location, and detecting whether a voice signal exists in the sound signal, to generate a detection result; and if the detection result is that the voice signal exists in the sound signal, generating a masking sound for the voice signal, and outputting the masking sound to a first speaker at the voice source location and a second speaker at the target masking location; or if the detection result is that no voice signal exists in the sound signal, skipping generating the masking sound.

Based on the foregoing solution, when the voice signal needs to be masked, the masking sound may be output to the speaker at the target masking location, so that an occupant at the target masking location cannot understand or clearly hear voice content from the voice source location, and privacy of an occupant at the voice source location is protected. In addition, in this solution, the sound signal from the voice source location is detected, and generation of the masking sound is controlled based on the detection result, so that when there is no voice input at the voice source location, the masking sound may not continuously interfere with the occupant at the target masking location.

In a possible implementation, a voice masking activation instruction is first received, then the voice source location is determined based on a source location of the activation instruction, and the target masking location is determined based on occupant information obtained by a sensor in the vehicle. The voice source location may be accurately determined based on the source location of the instruction, and a distribution of occupants in the vehicle may be intelligently identified based on a shot occupant picture, to determine the target masking location, so that the masking sound may not be sent to an irrelevant location.

In a possible implementation, the voice source location and the target masking location are determined based on an input of an occupant in the vehicle. The voice source location and the target masking location are determined based on the dynamic input of the occupant, so that the occupant can have better experience. In addition, this is applicable to different scenarios, for example, a scenario in which the occupant does not expect to be shot by a camera in the vehicle.

In a possible implementation, enhancement processing may be performed on the sound signal at the voice source location, to provide a clearer sound signal for subsequent voice detection, to improve accuracy of voice detection. Optionally, the voice enhancement processing includes echo cancellation processing and/or adaptive voice noise reduction processing.

In a possible implementation, time domain inversion processing is performed on the voice signal, to generate the masking sound.

In a possible implementation, noise data is obtained from a noise database, and the masking sound is generated by using the noise data, or the masking sound is generated by using the voice signal and the noise data. Optionally, the noise data in the noise database is preset. The voice feature of the voice signal is analyzed, to obtain, from the noise database, the noise data corresponding to the voice feature. This application provides a plurality of masking sound generation manners, and an implementation is more flexible.

In a possible implementation, automatic gain control adjustment may be performed on the masking sound, so that a volume of the masking sound falls within a specified range, to avoid volume fluctuation or sound leakage of the masking sound, so as to ensure masking effect of the target masking location.

In a possible implementation, sound field control processing is performed on the masking sound based on the voice source location and the target masking location, to output a first masking sound and a second masking sound, where the sound field control processing includes adjusting a phase and an amplitude of each frequency signal in the masking sound, then, outputting the first masking sound to the first speaker at the voice source location, and outputting the second masking sound to the second speaker at the target masking location.

In this application, sound field control processing is performed on the masking sound, so that the first speaker at the voice source location and the second speaker at the target masking location play different masking sounds. In this way, the masking sound at the target masking location meets a masking requirement, and the masking sound played by the speaker at the voice source location is canceled by a masking sound at the another location, to avoid interference caused by the masking sound from the another location to an occupant at the voice source location. Sound field control processing may be performed on the masking sound based on the voice source location and the target masking location, to output masking sounds of N channels, where the masking sounds of the N channels include the first masking sound and the second masking sound, N is a quantity of speakers in a cockpit, and a volume of the masking sound of the first speaker at the voice source location is lower than a volume of the masking sound of the second speaker at the target masking location.

A plurality of speakers in the cockpit are coordinated and controlled through sound field control processing to play the masking sound, so that a sound field dark zone can be formed at the voice source location (to avoid interference of the masking sound to the voice source location), and a sound field bright zone is formed at the target masking location (to ensure masking effect at the target masking location); and in addition, various requirements for private voice communication in the cockpit can be met, for example, a voice is expected to be masked for a front-row occupant when a back-row occupant performs voice communication, and for another example, a voice is masked for a driver seat when a back-row occupant communicates with a co-driver occupant. Further, when the target masking location includes the driver seat, the second speaker includes a speaker located at a headrest of the driver seat. The masking sound is played through a speaker of a headrest at the target masking seat, so that the masking sound has a stronger directivity and better masking effect.

In a possible implementation, when the target masking location includes the driver seat, a volume of a vehicle safety alarm sound in the driver seat is increased. The volume of the vehicle safety alarm sound is increased, so that it can be ensured that a driver can hear the safety alarm sound.

Further, an outside-vehicle sound may be obtained, specific type identification is performed on the outside-vehicle sound to identify a specific sound in the outside-vehicle sound, and then the specific sound is output to a speaker near the driver seat. The specific type sound may include an alarm sound of an ambient environment, for example, a siren sound. An outside-vehicle specific-type sound is captured and identified, and the specific type sound is played in the vehicle, so that it can be ensured that the driver responds to an outside-vehicle environment, to improve driving safety.

In a possible implementation, a voice masking deactivation instruction may be further received, and receiving the sound signal at the voice source location is stopped based on the deactivation instruction.

According to a second aspect, this application provides a voice masking apparatus, including:

- a location determining module, configured to determine a voice source location and a target masking location; a voice detection module, configured to: receive a sound signal from the voice source location, and detect whether a voice signal exists in the sound signal, to generate a detection result; a masking sound generation module, configured to generate a masking sound based on the detection result, and configured to: if the detection result is that the voice signal exists in the sound signal, generate the masking sound for the voice signal; or if the detection result is that no voice signal exists in the sound signal, skip generating the masking sound; and a masking sound post-processing module, configured to output the masking sound to a first speaker at the voice source location and a second speaker at the target masking location.

In a possible implementation, the location determining module is configured to: receive a voice masking activation instruction; and determine the voice source location based on a source location of the activation instruction, and determine the target masking location based on occupant information obtained by a sensor in a vehicle.

In a possible implementation, the location determining module is configured to determine the voice source location and the target masking location based on a voice source location and a target masking location that are input by an occupant in a vehicle.

In a possible implementation, the voice detection module is further configured to perform enhancement processing on the sound signal after receiving the sound signal from the voice source location. The enhancement processing includes echo cancellation processing and/or adaptive voice noise reduction processing.

In a possible implementation, the masking sound generation module is configured to generate the masking sound by performing time domain inversion processing on the voice signal.

In a possible implementation, the masking sound generation module is configured to: obtain noise data in a noise database, and generate the masking sound by using the noise data, or generate the masking sound by using the voice signal and the noise data. Optionally, the noise data is preset. The masking sound generation module is configured to: analyze a voice feature of the voice signal, obtain the noise data, from the noise database, corresponding to the voice feature, and use the noise data to generate the masking sound.

In a possible implementation, the masking sound post-processing module is further configured to perform automatic gain control adjustment on the masking sound before outputting the masking sound to the first speaker at the voice source location and the second speaker at the target masking location, so that a volume of the masking sound falls within a specified range.

In a possible implementation, the masking sound post-processing module is configured to: perform sound field control processing on the masking sound based on the voice source location and the target masking location to output a first masking sound and a second masking sound, where the sound field control processing includes adjusting a phase and an amplitude of each frequency signal in the masking sound; and output the first masking sound to the first speaker at the voice source location, and output the second masking sound to the second speaker at the target masking location.

The performing sound field control processing on the masking sound based on the voice source location and the target masking location to output a first masking sound and a second masking sound includes: performing sound field control processing on the masking sound based on the voice source location and the target masking location to output masking sounds of N channels, where the masking sounds of the N channels include the first masking sound and the second masking sound, and N is a quantity of speakers in the cockpit, where a volume of the masking sound received by the first speaker is lower than a volume of the masking sound received by the second speaker. Further, when the target masking location includes a driver seat, the second speaker includes a speaker located at a headrest of the driver seat.

In a possible implementation, when the target masking location includes the driver seat, the masking sound post-processing module is further configured to increase a volume of a vehicle safety alarm sound. Further, the masking sound post-processing module is further configured to: obtain an outside-vehicle sound, perform specific type identification on the outside-vehicle sound to identify a specific sound in the outside-vehicle sound, and output the specific sound to the speaker in the driver seat.

In a possible implementation, the location determining module is further configured to receive a voice masking deactivation instruction; and the voice detection module is further configured to stop, based on the deactivation instruction, receiving the sound signal from the voice source location.

According to a third aspect, this application provides a voice masking apparatus. The voice masking apparatus includes a processor and a memory. The memory is configured to store instructions, and the processor is configured to execute the instructions stored in the memory, to implement the method according to the first aspect or any one of the possible implementations of the first aspect.

According to a fourth aspect, this application provides a voice masking system, used in a vehicle. The voice masking system includes:

- a voice masking activation and/or deactivation apparatus, configured to control activation and/or deactivation of a voice masking function; a microphone, deployed at a voice source location, configured to capture a voice at the voice source location; a first speaker, deployed at the voice source location; and a second speaker, deployed at a target masking location, where the first speaker and the second speaker are configured to play a masking sound.

In a possible implementation, the voice masking system further includes a camera, and the camera is configured to shoot an occupant picture in a vehicle.

In a possible implementation, the voice masking system further includes an information input apparatus, and the information input apparatus is used by an occupant in the vehicle to input the voice source location and the target masking location.

In a possible implementation, the microphone further includes a microphone deployed outside the vehicle, and the microphone deployed outside the vehicle is configured to capture an outside-vehicle sound.

According to a fifth aspect, this application provides a computer-readable storage medium. The computer-readable storage medium is configured to store a computer program. When the computer program is run on a computer, the computer is enabled to perform the method according to the first aspect or any one of the implementations of the first aspect.

According to a sixth aspect, this application provides a vehicle. The vehicle includes any one of the apparatus according to the second aspect, the apparatus according to the third aspect, and the system according to the fourth aspect.

According to a seventh aspect, this application provides a chip, including a processor, configured to read instructions to perform the method according to the first aspect or any one of the possible implementations of the first aspect.

According to an eighth aspect, this application provides a computer program product, including computer program code. When the computer program code is run on a computer, the computer is enabled to perform the method according to the first aspect or any one of the implementations of the first aspect.

For technical effects brought by the second aspect to the eighth aspect or the possible implementations, refer to the descriptions of the technical effects brought by the first aspect or the corresponding implementations.

BRIEF DESCRIPTION OF DRAWINGS

To describe technical solutions in this application more clearly, the following briefly describes the accompanying drawings in embodiments of this application.

DESCRIPTION OF EMBODIMENTS

Figure 1:
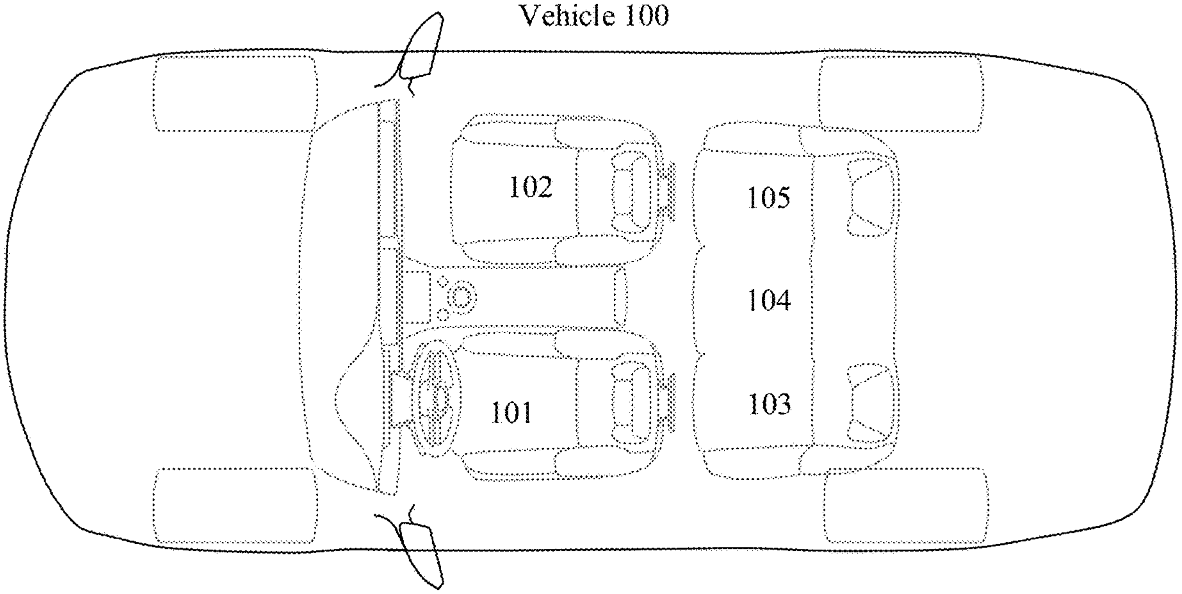
FIG. 1 is a diagram of a seat distribution in a vehicle cockpit according to an embodiment of this application.

The following describes in detail technical solutions in embodiments of this application with reference to accompanying drawings. Identical reference numerals in the accompanying drawings indicate elements that have same or similar functions. Although various aspects of embodiments are illustrated in the accompanying drawing, the accompanying drawings are not necessarily drawn in proportion unless otherwise specified.

Reference to “an embodiment”, “some embodiments”, or the like described in this specification indicates that one or more embodiments of this application include a specific feature, structure, or characteristic described with reference to embodiments. Therefore, statements such as “in an embodiment”, “in some embodiments”, “in some other embodiments”, and “in other embodiments” that appear at different places in this specification do not necessarily mean referring to a same embodiment. Instead, the statements mean “one or more but not all of embodiments”, unless otherwise emphasized in another manner. The terms “include”, “comprise”, “have” and their variants all mean “include but are not limited to”, unless otherwise emphasized in another manner.

The terms such as “first” and “second” in this application are used to distinguish between same or similar items with basically same roles and functions. It should be understood that there is no logical or timing dependency between “first”, “second”, and “nth”, and neither a quantity nor an execution sequence is limited.

In this application, at least one means one or more, and a plurality of means two or more. “And/or” describes an association relationship between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects. At least one of the following items (pieces) or a similar expression thereof means any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In addition, to better describe this application, numerous specific details are given in the following specific implementations. A person skilled in the art should understand that this application can also be implemented without some specific details.

A method provided in embodiments of this application is applicable to a scenario in which a voice needs to be masked when an occupant in a cockpit performs voice communication or when an occupant is in a call, and is particularly applicable to a scenario in which a voice needs to be masked for a front-row driver when a back-row occupant speaks.

FIG. 1 is a diagram of a seat distribution in a vehicle cockpit according to an embodiment of this application. As shown in FIG. 1, front-row and back-row seats are deployed in a vehicle 100, including a driver seat 101, a co-driver seat 102, a back-row left seat 103, a back-row middle seat 104, and a back-row right seat 105. For example, when an occupant in the back-row left seat 103 talks with an occupant in the back-row right seat 105, if conversation content relates to privacy or business content, the back-row occupants do not expect that the conversation content is heard by occupants in the driver seat 101 and the co-driver seat 102 in a front row. For another example, when an occupant (namely, a driver) in the driver seat 101 is in a call, call content may be heard by an occupant in the co-driver seat 102 and a back-row occupant. If the call content relates to personal privacy, this is not what the occupant in the driver seat 101 expects.

For the foregoing problem, this application provides a solution. First, a voice source location and a target masking location are determined, then a sound signal at the voice source location is received, whether a voice signal exists in the sound signal is detected, a masking sound is generated based on a detection result, and further, the masking sound is played through a first speaker at the voice source location and a second speaker at the target masking location, so that an occupant at the target masking location cannot understand or cannot clearly hear what an occupant at the voice source location says.

Figure 2:
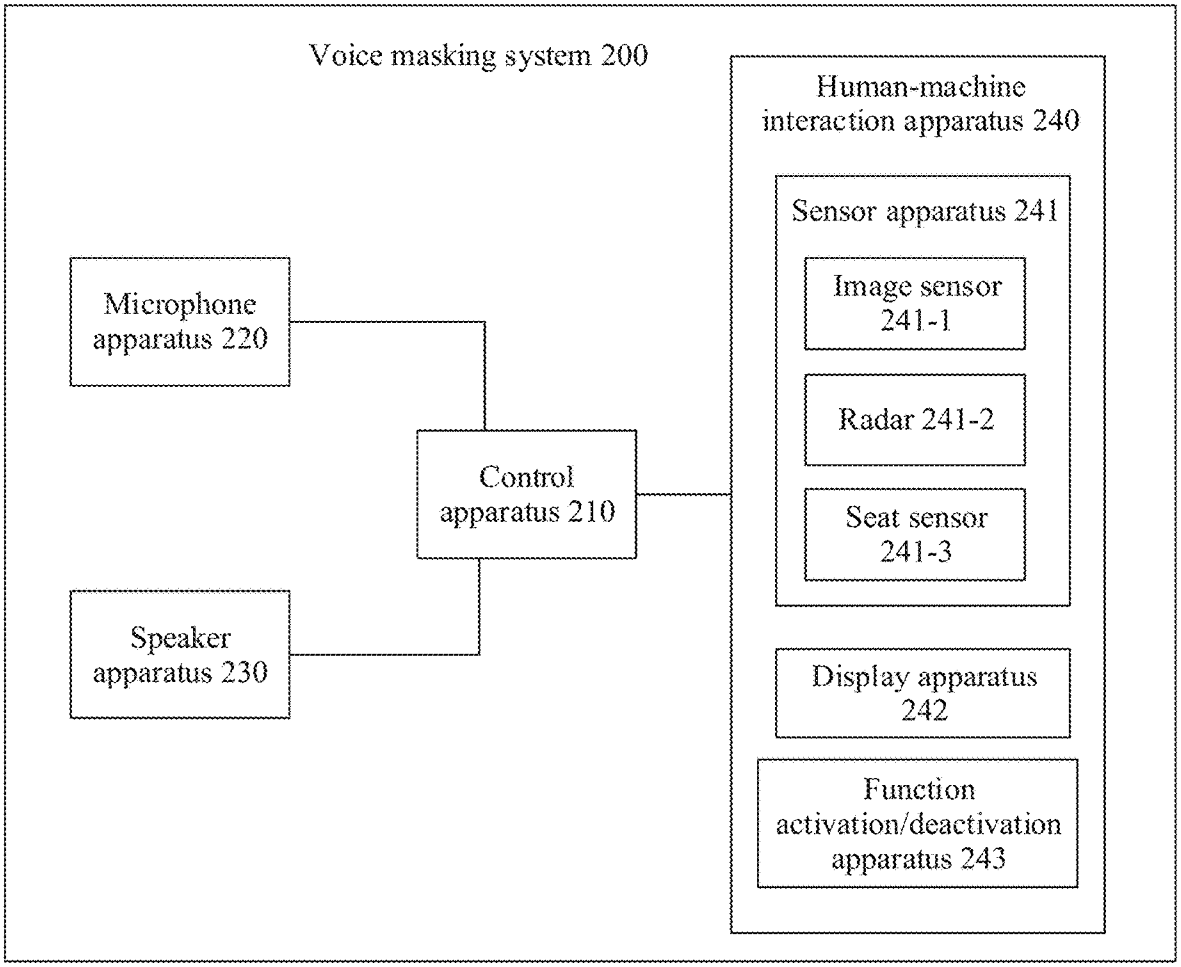
FIG. 2 is a diagram of a voice masking system of a vehicle according to an embodiment of this application.

The solution provided in embodiments of this application may be implemented through a voice masking system 200 shown in FIG. 2. As shown in FIG. 2, the voice masking system 200 includes but is not limited to a control apparatus 210, a microphone apparatus 220, and a speaker apparatus 230. The control apparatus 210 may be connected to the microphone apparatus 220 and the speaker apparatus 230. The control apparatus 210 may be a hardware platform having a processing capability, a software platform having a processing capability, or a platform integrating hardware and software having a processing capability, for example, may be implemented as an in-vehicle computing platform and/or a cockpit domain control platform. This is not limited in this application. The speaker apparatus 230 may include one or more speakers deployed at different locations.

The voice masking system 200 may further include an interaction apparatus 240, and the interaction apparatus 240 may include a sensor apparatus 241. The sensor apparatus 241 may include but is not limited to a part or all of an image sensor 241-1, a radar 241-2, and a seat sensor 241-3. The image sensor 241-1 may be a camera, and the image sensor 241-1 may be configured to capture an image in a vehicle cockpit. A quantity and deployment locations of the image sensors 241-1 are not limited in this application. The radar 241-2 may include one or more of an ultrasonic radar, a millimeter-wave radar, and the like, and is configured to detect an occupant in the vehicle cockpit. The seat sensor 241-3 is configured to detect whether an occupant is in a seat of a vehicle, and the seat sensor 241-3 may be a gravity sensor. The control apparatus 210 may obtain related information of an occupant location in the cockpit through the sensor apparatus 241.

The interaction apparatus 240 may further include a display apparatus 242. The display apparatus 242 includes a mobile terminal or a display in the cockpit, and is configured to: interact with an occupant and receive an input of the occupant. The interaction apparatus 240 may further include a function activation/deactivation apparatus 243 in the cockpit, and the function activation/deactivation apparatus 243 may include a physical button switch and the like.

With development of intelligent vehicles and increasing requirements of people for interaction and audio quality in the vehicle cockpit, there are an increasing quantity of microphones and speakers in the vehicle. Deployment locations of the speakers are also increasingly scientific, to achieve a superior sound field and sound effect experience. Deployment locations of the microphones are also as close as possible to an occupant in the cockpit, to facilitate capture of a sound signal of the occupant in the cockpit.

Figure 3:
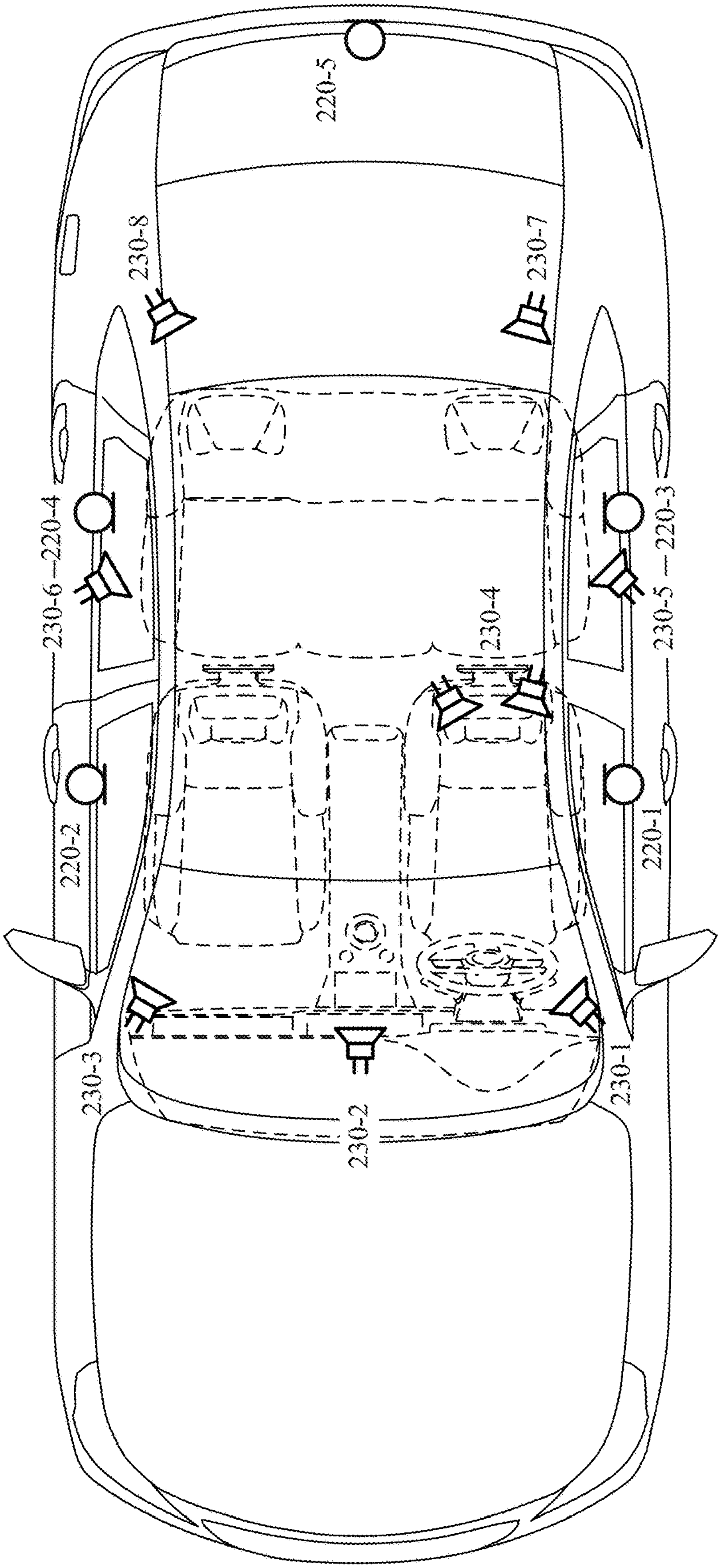
FIG. 3 is a diagram of deployment locations of a microphone and a speaker of a vehicle according to an embodiment of this application.

FIG. 3 is a diagram of deployment locations of a microphone and a speaker of a vehicle according to an embodiment of this application. As shown in FIG. 3, the speaker apparatus 230 of the vehicle may include a speaker 230-1 to a speaker 230-8. The speaker may be deployed around the cockpit in a surround manner, or may be deployed in a headrest of a seat in the cockpit, for example, a speaker 230-4, where the speaker is deployed in a headrest of a driver seat. A deployment location and a pointing direction of the speaker are properly configured, so that a superior sound effect sound field can be formed in the cockpit. The microphone apparatus 220 of the vehicle may include a microphone 220-1 to a microphone 220-4 in the cockpit. The microphone in the cockpit is deployed above or on a side of a seat of an occupant, and is as close as possible to a head location of the occupant. In addition, the microphone of the vehicle may further include an outside-vehicle microphone 220-5, and the outside-vehicle microphone is mainly configured to capture a sound outside the vehicle. It should be understood that deployment locations and quantities of the speakers and the microphones are merely examples, and do not indicate all deployment manners. The deployment locations and the quantities of the speakers and the microphones are not limited in this application. However, it should be understood that all deployment manners that meet requirements of this application fall within a protection scope of this application.

It should be understood that, for ease of understanding and description, the following describes the method provided in embodiments of this application by using a control apparatus in a vehicle as an execution body. For example, the control apparatus may be the control apparatus 210 in FIG. 2. The control apparatus may be a component in the vehicle, for example, a chip, a chip system, or another functional module that can invoke and execute a program. However, it should be understood that this should not constitute any limitation on the execution body of the method provided in this application. In this application, the control apparatus 210 may also be referred to as a voice masking apparatus.

Figure 4:
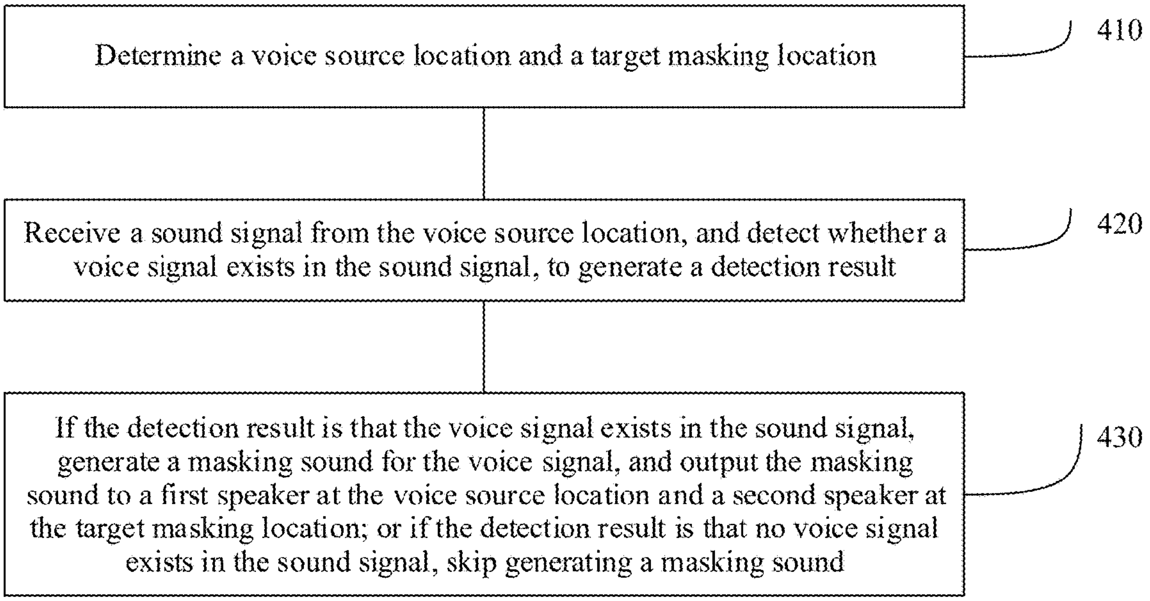
FIG. 4 is a schematic flowchart of a voice masking method according to an embodiment of this application.

FIG. 4 is a schematic flowchart of a voice masking method according to an embodiment of this application. As shown in FIG. 4, the method may include step S410 to step S430.

S410: Determine a voice source location and a target masking location.

Optionally, S410 may be implemented in any one of the following manners. A specific manner to be used may depend on implementations of a control apparatus and a device in a vehicle cockpit.

In an embodiment, before the method S410, the method further includes: receiving a voice masking activation instruction. Determining the voice source location and the target masking location includes: determining the voice source location based on a source location of the activation instruction; and obtaining occupant information obtained by a sensor apparatus in a vehicle, and determining the target masking location based on the occupant information. The sensor apparatus may include the sensor apparatus 241. The activation instruction may be triggered by a function activation/deactivation apparatus at the voice source location in the cockpit. The function activation/deactivation apparatus may be the function activation/deactivation apparatus 243. A location of the function activation/deactivation apparatus may be positioned based on the activation instruction, to determine the source location of the instruction.

For example, an occupant picture in the cockpit may be obtained through an image sensing device (for example, a camera) in the cockpit, to determine an occupant location distribution in the cockpit from the occupant picture, so as to determine the target masking location.

For example, an occupant in the cockpit may be detected through a radar (for example, a millimeter-wave radar) in the cockpit, to determine an occupant location distribution in the cockpit, so as to determine the target masking location.

For example, whether an occupant is in a seat of the vehicle may be detected through a pressure sensor of the seat in the cockpit, to determine an occupant location distribution in the cockpit, so as to determine the target masking location.

For example, a plurality of sensor combinations, for example, a combination of a pressure sensor and an image sensor, may be used to more accurately determine an occupant location distribution in the cockpit, so as to more accurately determine the target masking location.

In an embodiment, the voice source location and/or the target masking location are/is a voice source location and/or a target masking location input by an occupant in the vehicle. For example, the occupant may input the voice source location and/or the target masking location through a display apparatus. The display apparatus may include the display apparatus 242. The display apparatus may be deployed at a location such as a center console, a location behind a seat headrest, or a back-row center console.

Figure 5:
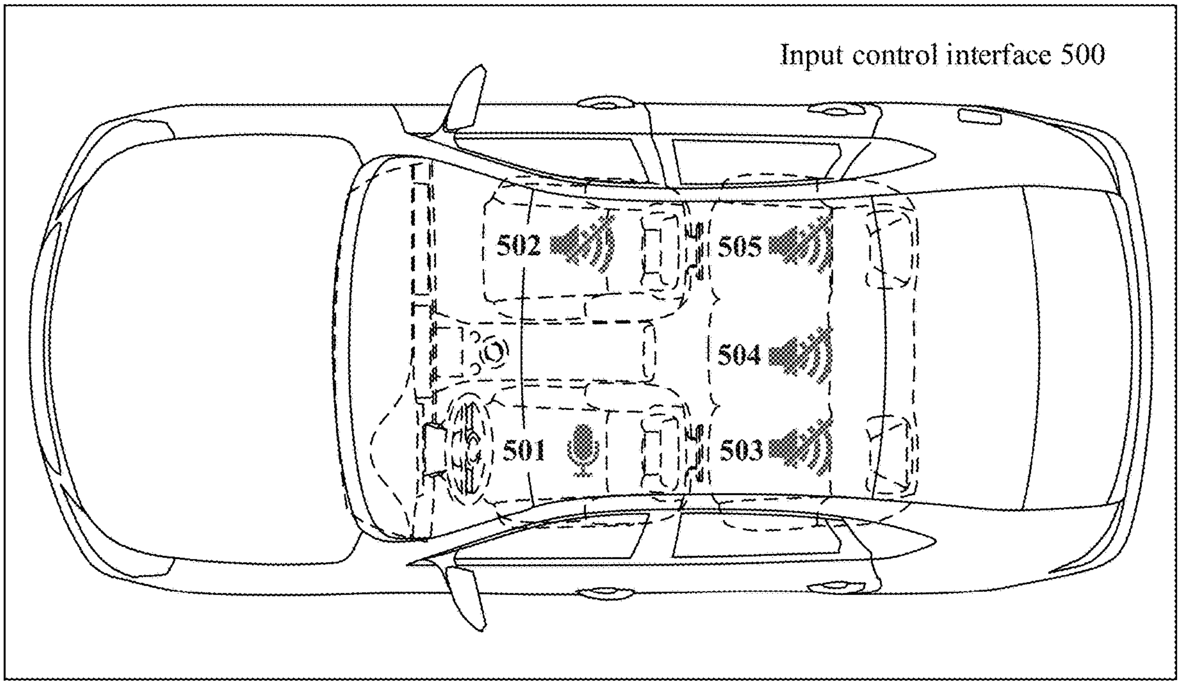
FIG. 5 is a diagram of an input control interface of a voice source location and/or a target masking location according to an embodiment of this application.

FIG. 5 shows an input control interface 500 of a voice source location and/or a target masking location according to an embodiment of this application. In the input control interface shown in FIG. 5, a microphone icon indicates the voice source location, and a mute icon indicates the target masking location. As shown in FIG. 5, a location of a seat 501 is a voice source location, and a seat 502, a seat 503, a seat 504, and a seat 505 are target masking locations. An occupant may tap an icon to switch a corresponding seat location to the voice source location or the target masking location. For example, the occupant may tap a mute icon of the seat 502 in the input control interface to switch a location of the seat 502 to the voice source location. In this case, both the seat 501 and the seat 502 are voice source locations, an occupant at the location of the seat 502 can understand voice content from an occupant at the location of the seat 501, and voices of the occupants in the seat 501 and the seat 502 are not clearly heard or understood by occupants in the seat 503, the seat 504, and the seat 505.

The input control interface is provided, so that an occupant can dynamically control and adjust a location at which voice masking needs to be performed, and various scenarios in the cockpit can be more flexibly adapted, to improve occupant experience. For example, when a back-row occupant makes a call or talks, conversation content needs to be masked for a front row. For another example, when an occupant in a co-driver seat needs to join in a conversation between back-row occupants, adjustment may be flexibly performed in the input interface. It should be understood that the input control interface provided in this embodiment is merely an example of the input control interface, and the voice source location and the target masking location may alternatively be indicated by using other icons. In addition, the input control interface may further show an occupant location in the current vehicle cockpit, and the occupant location may be identified through various sensing devices in the cockpit. In addition, the input control interface may alternatively be selection switches/a selection switch of the voice source location and/or the target masking location, a voice receiving apparatus, or the like. Adjustment manners/an adjustment manner of the voice source location and/or the target masking location, the input control interface, and an input control manner are not limited in embodiments of this application.

In an embodiment, the voice source location may be determined based on the source location of the voice masking activation instruction, and the target masking location may be determined based on an input of the occupant in the vehicle. For example, the voice masking function activation/deactivation apparatus may be deployed above or on a side of a seat of an occupant. When the occupant in the cockpit triggers voice masking activation and/or deactivation, the control apparatus determines a physical location of the voice masking activation and/or deactivation apparatus based on the received voice masking activation instruction. In this case, a seat location corresponding to the physical location of the voice masking activation and/or deactivation apparatus is used as the voice source location.

The foregoing determining manners of the voice source location and the target masking location may be combined. For example, the voice source location is determined by combining the image sensor and an instruction source location. It should be understood that the combined location determining manner should also fall within the protection scope of this application.

S420: Receive a sound signal from the voice source location, and detect whether a voice signal exists in the sound signal, to generate a detection result.

In an embodiment, after the receiving the sound signal from the voice source location in step S420, the method further includes: performing enhancement processing on the sound signal.

Figure 6:
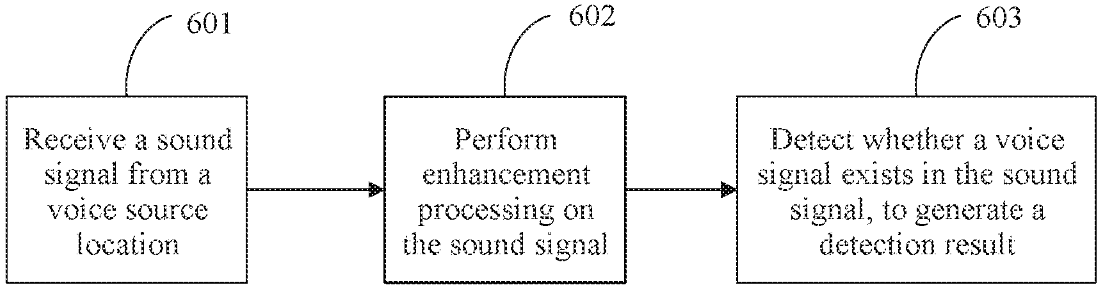
FIG. 6 is a diagram of a method for performing enhancement processing on a sound signal according to an embodiment of this application.

To be specific, step S420 includes the following steps shown in FIG. 6.

601: Receive the sound signal from the voice source location.

602: Perform enhancement processing on the sound signal, to generate an enhanced sound signal.

603: Detect whether the voice signal exists in the enhanced sound signal, to generate the detection result.

In an embodiment, the enhancement processing may include echo cancellation processing and/or adaptive voice noise reduction processing.

The enhancement processing is performed on the sound signal, so that noise in the sound signal can be reduced, and the sound signal is clearer. This helps improve accuracy of the detection result indicating whether the voice signal exists in the sound signal.

In an embodiment, the sound signal may be detected in a voice activity detection (VAD) manner, to generate the detection result indicating whether the voice signal exists in the sound signal.

S430: If the detection result is that the voice signal exists in the sound signal, generate a masking sound for the voice signal, and output the masking sound to a first speaker at the voice source location and a second speaker at the target masking location; or if the detection result is that no voice signal exists in the sound signal, skip generating a masking sound.

Whether to generate the masking sound is controlled based on the detection result indicating whether the voice signal exists, so that when no voice signal exists, the masking sound may not disturb the target masking location. For example, when an occupant at a driver seat is in a call, a peer end in the call may be speaking for a long time, and the occupant in the driver seat is in a listening state. In this case, because no voice signal is detected, the masking sound does not need to be generated. In this way, interference of the masking sound to another occupant in the cockpit can be avoided.

In an embodiment, a voice signal buffer mechanism is set, and a masking sound is generated by using a buffered voice signal in a gap (for example, 2 s) in which an occupant at the voice source location pauses when speaking, so that continuity of masking effect can be ensured. For example, it may be set that voice signal content with a size of 500-ms duration is buffered. It should be understood that a buffer setting manner and a buffer size are not limited in this application. In addition, the buffered voice signal content may be updated depending on whether the voice signal exists. When the voice signal is detected, the buffered voice signal content is updated based on the voice signal; and when no voice signal is detected, the buffered voice signal content is not updated.

Similarly, the generated masking sound may be further buffered, and a masking sound buffer mechanism is used to ensure the continuity of masking effect in the gap in which the occupant at the voice source location pauses when speaking. The mechanism is consistent with the foregoing buffering the voice signal.

Figure 7A:
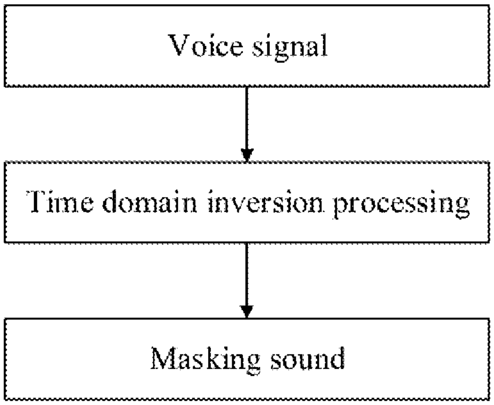
FIG. 7A is a diagram of a masking sound generation method according to an embodiment of this application.

In an embodiment, as shown in FIG. 7A, the masking sound is generated by performing time domain inversion processing on the voice signal.

Figure 7B:
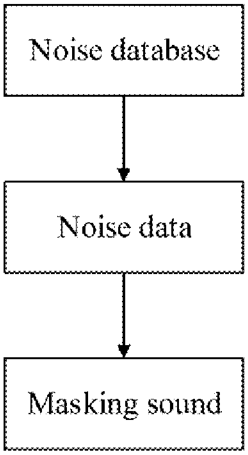
FIG. 7B is a diagram of another masking sound generation method according to an embodiment of this application.

In an embodiment, as shown in FIG. 7B, the masking sound is generated by using noise data obtained from a noise database. The noise data in the noise database may include one or more of white noise, narrowband noise, speech noise, and the like. The noise data may be preset in a system, or may be downloaded from a cloud and updated in real time. The noise data in the noise database and a data source are not limited in this application.

In an embodiment, the noise data in the noise database is obtained, and the masking sound is generated by using the noise data and the voice signal. For example, time domain inversion processing may be performed on the voice signal to obtain a processed voice signal, and the processed voice signal and the noise data obtained from the noise database are fused to generate the masking sound.

Figure 7C:
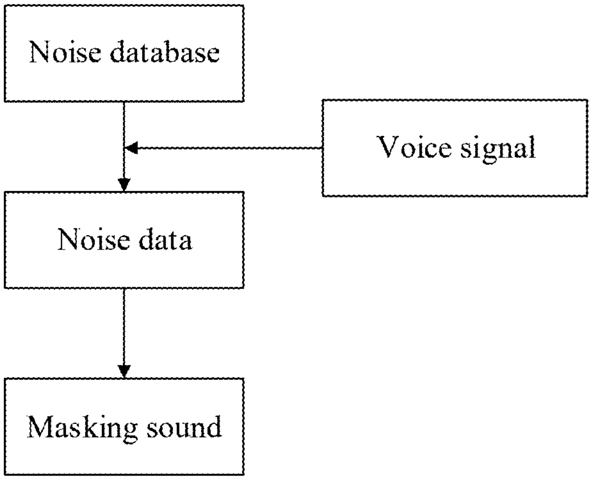
FIG. 7C is a diagram of still another masking sound generation method according to an embodiment of this application.

In an embodiment, as shown in FIG. 7C, a voice feature of the voice signal is analyzed, the noise data corresponding to the voice feature is obtained from the noise database, and then the masking sound is generated by using the noise data. The noise data in the noise database is matched based on the voice feature, so that the obtained noise data can better match the voice signal, the masking sound is more comfortable for the occupant at the target masking location, and the masking effect is better. Further, the masking sound may alternatively be generated through a neural network model by analyzing the voice feature of the voice signal.

It should be understood that the foregoing embodiments of generating the masking sound may be combined with each other to generate the masking sound. There is another manner of generating the masking sound. This is not limited in this application.

In an embodiment, automatic gain control (AGC) adjustment may be further performed on the generated masking sound, so that a volume of the masking sound falls within a specified range. The volume of the masking sound is controlled, to keep the volume within the specified range, so that the volume of the masking sound can be as small as possible, to avoid discomfort of the occupant at the target masking location, and the volume of the masking sound can be stable, to avoid volume fluctuation or sound leakage, so as to ensure the masking effect.

In an embodiment, sound field control processing is performed on the masking sound based on the voice source location and the target masking location, to output a first masking sound and a second masking sound, where the sound field control processing includes adjusting a phase and an amplitude of each frequency signal in the masking sound, outputting the first masking sound to the first speaker at the voice source location, and outputting the second masking sound to the second speaker at the target masking location.

The speaker used for playing the masking sound is determined based on location information of the voice source location and the target masking location. The first speaker at the voice source location and the second speaker at the target masking location are coordinated and controlled through sound field control, so that the first speaker and the second speaker play different masking sounds, a bright zone is formed at the target masking location, and a dark zone is formed at the voice source location. In this way, the occupant at the target masking location cannot understand or clearly hear voice content from the occupant at the voice source location, and interference caused by the masking sound played at the target masking location to the occupant at the voice source location can be avoided.

The following briefly describes the sound field control from a perspective of sound masking and noise reduction principles.

A phenomenon that an auditory feeling of a weak sound (masked sound) is affected by another strong sound (masking sound) is called masking effect of a human ear. Generally, two sounds whose frequencies are closer to each other have larger masking amounts. In addition, a high-frequency sound is easily masked by a low-frequency sound, and a low-frequency sound is difficult to be masked by a high-frequency sound. For example, in a concert scenario, a sound pressure level of a bass drum may not be high, but people can also clearly hear a sound of the bass drum from music of the concert, a violin sound is easily masked by another low-frequency instrument.

Based on the foregoing principle, in this embodiment of this application, the speaker near the target masking location plays the masking sound, and a voice from the voice source location is masked at a human ear location of the occupant at the target masking location, so that the occupant at the target masking location cannot understand or clearly hear voice content at the voice source location.

Figure 8:
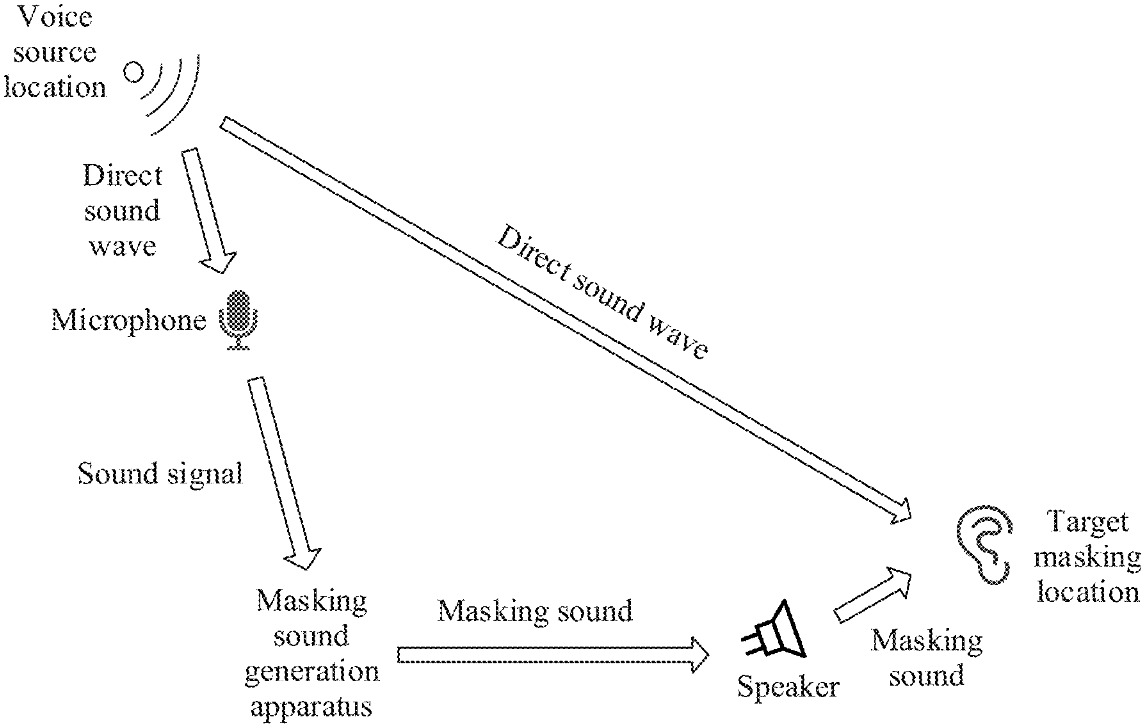
FIG. 8 is a diagram of a sound masking principle according to an embodiment of this application.

As shown in FIG. 8, because there is a specific distance between the occupant at the voice source location and the occupant at the target masking location, the voice of the occupant at the voice source location is propagated to an ear location at the target masking location through an air propagation path (a direct sound wave). In addition, a microphone near the occupant at the voice source location captures a sound signal of the occupant at the voice source location (a direct sound wave), the voice signal is detected from the sound signal, then the masking sound is generated through a masking sound generation apparatus, the masking sound is output to a speaker near the target masking location, and finally the speaker near the target masking location plays the masking sound. In this case, at an ear of the occupant at the target masking location, the masking sound interferes with the voice of the occupant at the voice source location, to achieve an objective of voice masking.

When the masking sound is played at the target masking location, the masking sound at the target masking location is also propagated to the voice source location, and may cause interference to the occupant at the voice source location. Therefore, in this application, noise reduction processing may be further performed at the voice source location. For example, an active noise cancellation solution may be used. A principle of the active noise cancellation solution is as follows: Each sound includes a specific spectrum, and an active noise whose spectrum is the same as that of noise to be canceled and whose phase is exactly opposite (a difference is 180 degrees) to that of the noise to be canceled may be found, so that the noise to be canceled can be canceled.

Figure 9:
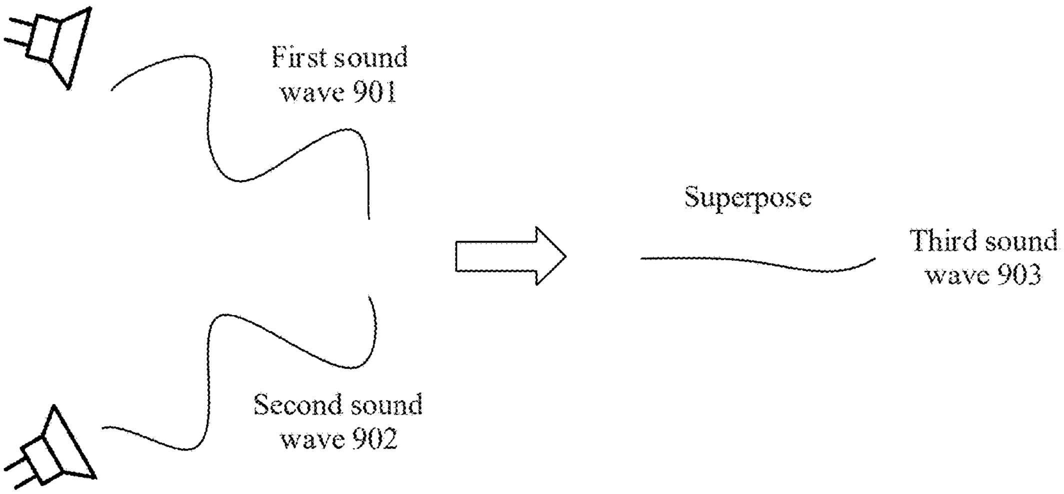
FIG. 9 is a diagram of a sound wave cancellation principle according to an embodiment of this application.

FIG. 9 is a diagram of a sound wave cancellation principle according to an embodiment of this application. As shown in FIG. 9, a first sound wave 901 and a second sound wave 902 have a same spectrum, but phases of the first sound wave 901 and the second sound wave 902 are exactly opposite (a difference is 180 degrees). A location at which the first sound wave 901 and the second sound wave 902 intersect is controlled through accurate calculation. For example, the location at which the first sound wave 901 and the second sound wave 902 intersect is a human ear, a sound wave obtained after the two sound waves intersect, superpose, and cancel each other is a third sound wave 903, and an amplitude of the third sound wave 903 is very small, so that the human ear can almost hear no noise at an intersection.

Based on the foregoing principle, an objective of forming a voice dark zone at the voice source location and forming a voice bright zone at the target masking location may be achieved through sound field control.

Figure 10:
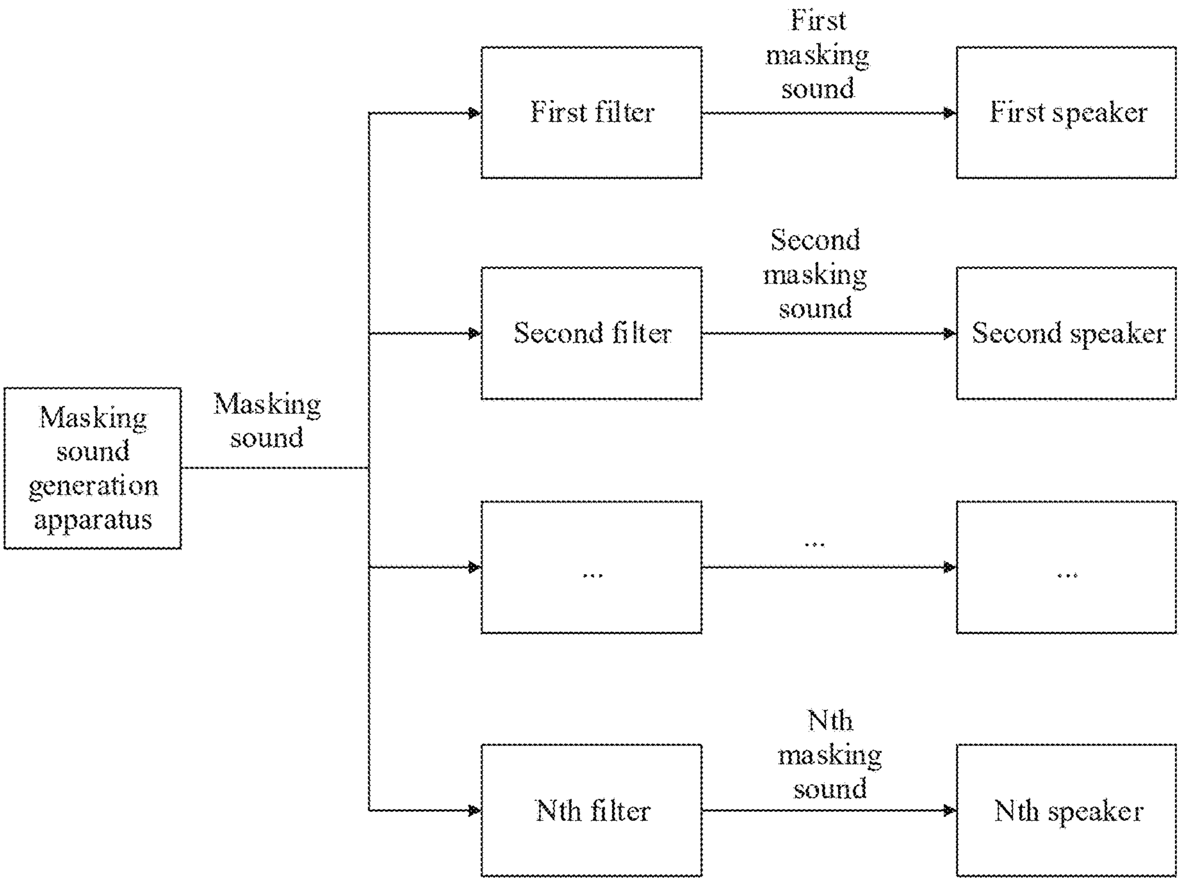
FIG. 10 is a diagram of sound field control according to an embodiment of this application.

FIG. 10 is a diagram of sound field control according to an embodiment of this application. As shown in FIG. 10, after generating the masking sound, the masking sound generation apparatus outputs the masking sound to a first filter and a second filter, and controls parameters of the first filter and the second filter to generate the first masking sound and the second masking sound, then, the first masking sound is output to the first speaker, and the second masking sound is output to the second speaker. The parameters of the first filter and the second filter are controlled, to adjust a phase and an amplitude of each frequency signal in the masking sound, so that the first masking sound and the second masking sound have different phases and amplitudes. The first speaker may be a speaker near the voice source location, for example, a speaker on a side of the voice source location. The second speaker may be a speaker near the target masking location, for example, a speaker on a side of the target masking location.

In an embodiment, a volume of the first masking sound received by the first speaker is lower than a volume of the second masking sound received by the second speaker.

In an embodiment, the masking sound may be further output to a third filter to generate a third masking sound, the third masking sound is output to a third speaker at the voice source location, and the first speaker and the third speaker at the voice source location work simultaneously, to improve noise reduction effect at the voice source location.

In an embodiment, the masking sound may be further output to a fourth filter to generate a fourth masking sound, the fourth masking sound is output to a fourth speaker at the target masking location, and the second speaker and the fourth speaker at the target masking location work simultaneously, to improve voice masking effect.

In an embodiment, the masking sound may be further output to N filters (the first filter to an Nth filter) to generate masking sounds (the first masking sound to an Nth masking sound) of N channels, where N is a quantity of speakers in the vehicle cockpit, the N masking sounds are output to N speakers (the first speaker to an Nth speaker), and sound field control of the entire cockpit is implemented by using all the speakers in the vehicle cockpit, so that there is no sound leakage and interference is low in voice masking at the target masking location, and the noise at the voice source location is smaller.

In an embodiment, human ear locations/a human ear location of the voice source location and/or the target masking location may be further identified, and a pointing direction of one or more speakers in the vehicle cockpit may be dynamically adjusted, to achieve better noise reduction effect and better voice masking effect. An identification manner may be using the millimeter-wave radar, a camera sensor, or the like in the cockpit. A specific identification manner is not limited in this application.

In an embodiment, when the target masking location is the driver seat and the driver seat is provided with a headrest speaker, better voice masking effect can be achieved by playing the masking sound through the headrest speaker, because the headrest speaker is closer to the human ear and has a stronger directivity.

Similarly, when the driver seat, the co-driver seat, and a back-row seat are provided with headrest speakers, the masking sound may be played through the headrest speakers in the driver seat, the co-driver seat, and the back-row seat, to achieve better voice masking effect.

In an embodiment, based on an occupant change (which may include an occupant location change, an occupant quantity change, and the like) in the cockpit, the target masking location may be dynamically adjusted, and the sound field control may be adaptively performed. For example, when a new occupant gets on the vehicle, after a location of the new occupant is detected, the sound field control is dynamically performed, and the voice masking is performed at the location of the new occupant. In an embodiment, when it is detected that an occupant gets off the vehicle and a location of an occupant changes, the occupant at the voice source location may be prompted in a manner like display or voice, so that the occupant at the voice source location adjusts the voice source location or the target masking location.

In an embodiment, the sound field control may be implemented by using a variable span trade-off (VAST) algorithm.

In an embodiment, when the target masking location includes the driver seat, a volume of a vehicle alert sound may be increased. The vehicle alert sound may include a vehicle safety alarm sound, and the safety alarm sound may include a battery level alarm, a fuel level alarm, and the like of the vehicle. The vehicle alert sound may further include a fault alarm sound and a safety alarm sound, for example, an obstacle anti-collision alarm and a tire pressure alarm. The vehicle may further include a function alert sound, for example, a navigation alert sound. The volume of the vehicle alert sound is increased, so that it can be ensured that the driver identifies an alarm in time while voice masking is ensured, to ensure driving safety.

In an embodiment, when the target masking location includes the driver seat, an outside-vehicle sound signal may be further obtained, specific type identification is performed on the outside-vehicle sound signal to identify a specific sound in an outside-vehicle sound, and the specific sound is output to the speaker in the driver seat. The outside-vehicle sound may be captured through an outside-vehicle microphone, the specific type identification is performed on the outside-vehicle sound, to identify the specific sound, and then the specific sound is played through the speaker in the driver seat. For example, when the vehicle drives, a rear vehicle whistles and overtakes the vehicle, a whistle of the rear vehicle is identified by identifying the outside-vehicle sound, then the whistle is played through the speaker near the driver seat, and the driver may be warned to take care and perform a corresponding safe driving action. A specific type of sound may include a whistle, a siren sound, a sound signal in a specific direction, an emergency sound signal, and the like.

It should be understood that only some vehicle alert sounds, some vehicle alarm sounds, and some specific types of sounds are shown herein, and more scenarios, and corresponding alert sounds and specific types of sounds may be further included. This is not limited herein in this application.

In an embodiment, a voice masking deactivation instruction may be further received, and receiving the sound signal at the voice source location is stopped based on the deactivation instruction. For example, the deactivation instruction may be triggered by the occupant at the voice source location by turning off the voice masking function activation/deactivation apparatus.

In an embodiment, the voice masking deactivation instruction may be further automatically triggered when it is detected that the occupant at the voice source location gets off the vehicle.

In an embodiment, a timeout mechanism may be further set. For example, the timeout mechanism is set to two minutes. When no voice signal is detected in the sound signal captured from the voice source location within two minutes, the voice masking deactivation instruction may be automatically triggered.

In an embodiment, the voice masking deactivation instruction may be further automatically triggered when it is detected that the occupant at the target masking location gets off the vehicle.

Embodiments described in this specification may be independent solutions, or may be combined based on internal logic. All of these solutions fall within the protection scope of this application.

It may be understood that the methods and operations implemented by the control apparatus in the foregoing method embodiments may alternatively be implemented by a component (for example, a chip or a circuit) that can be used for the control apparatus.

Figure 11:
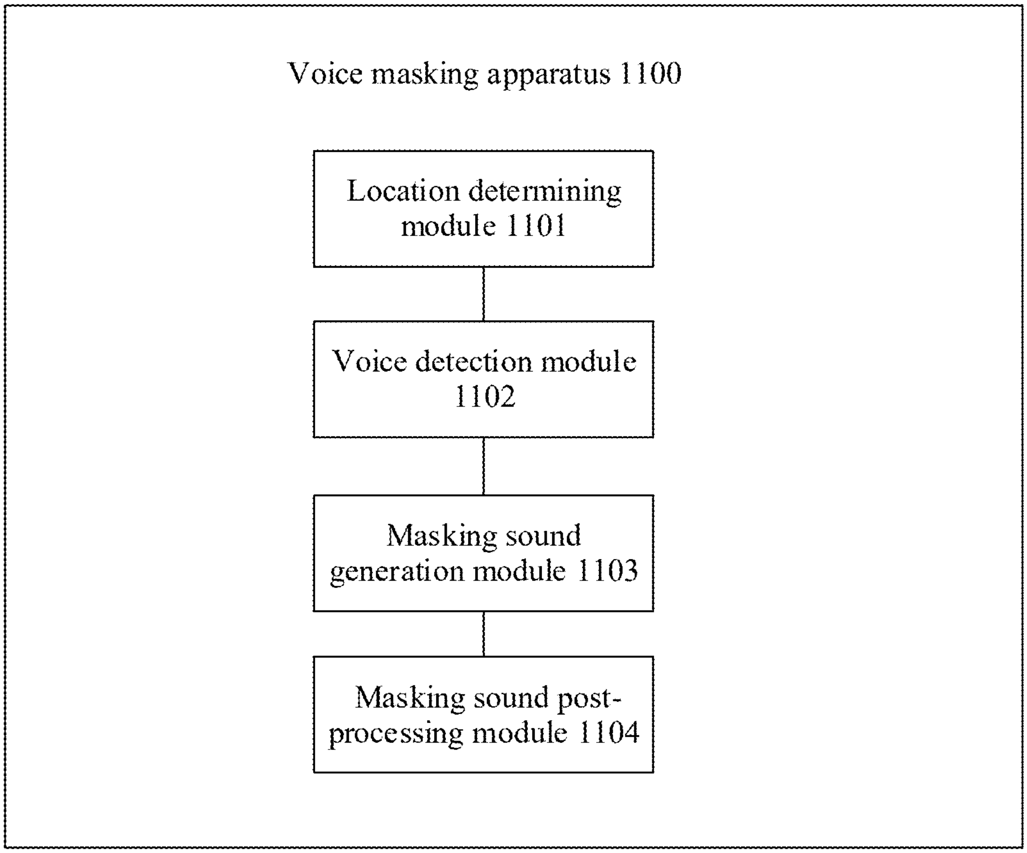
FIG. 11 is a diagram of a voice masking apparatus according to an embodiment of this application.
Figure 12:
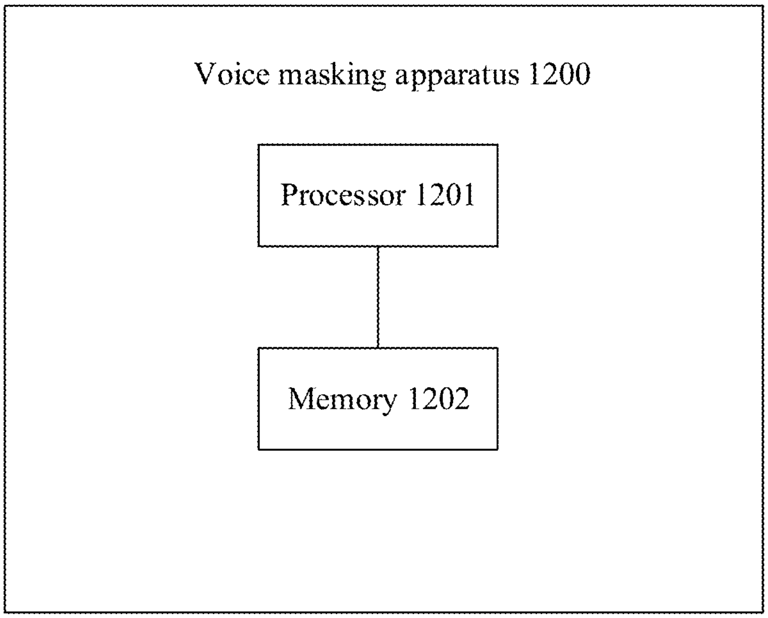
FIG. 12 is a diagram of another voice masking apparatus according to an embodiment of this application.

The following describes in detail the voice masking apparatus provided in embodiments of this application with reference to FIG. 11 and FIG. 12. It should be understood that descriptions of apparatus embodiments correspond to the descriptions of the method embodiments. Therefore, for content that is not described in detail, refer to the foregoing method embodiments.

As shown in FIG. 11, an embodiment of this application further provides a voice masking apparatus 1100, configured to implement functions of the control apparatus in the foregoing method, and the apparatus may be used in flowcharts shown in FIG. 4, FIG. 6, FIG. 7A, FIG. 7B, FIG. 7C, and FIG. 10 to perform functions in the foregoing method embodiments. For example, the apparatus may be a software module or a chip system. In this embodiment of this application, the chip system may include a chip, or may include a chip and another component. The voice masking apparatus 1100 may be the control apparatus 210 shown in FIG. 2.

In an embodiment, the voice masking apparatus 1100 is used in a vehicle, and the voice masking apparatus 1100 includes:

- a location determining module 1101, configured to determine a voice source location and a target masking location;
- a voice detection module 1102, configured to: receive a sound signal from the voice source location, and detect whether a voice signal exists in the sound signal, to generate a detection result;
- a masking sound generation module 1103, configured to generate a masking sound based on the detection result, where the masking sound generation module 1103 is configured to: if the detection result is that the voice signal exists in the sound signal, generate the masking sound for the voice signal; or if the detection result is that no voice signal exists in the sound signal, skip generating the masking sound; and
- a masking sound post-processing module 1104, configured to output the masking sound to a first speaker at the voice source location and a second speaker at the target masking location.

In an embodiment, the location determining module 1101 is further configured to: receive a voice masking function activation instruction, determine the voice source location based on a source location of the activation instruction, and determine the target masking location based on occupant information obtained by a sensor in the vehicle.

In an embodiment, the sensor includes one or more of an image sensor, a radar sensor, and a seat sensor, the image sensor may include a camera, the radar sensor may include one or more of an ultrasonic radar, a millimeter-wave radar, and the like, and the seat sensor may include one or more of a gravity sensor, a pressure sensor, and the like.

In an embodiment, the location determining module 1101 is further configured to: receive an input of an occupant in the vehicle, and determine the voice source location and/or the target masking location based on the input of the occupant, where the input of the occupant includes a voice source location and/or a target masking location that are/is input by the occupant.

In an embodiment, the voice detection module 1102 is further configured to perform enhancement processing on the sound signal after receiving the sound signal from the voice source location.

In an embodiment, the enhancement processing includes echo cancellation processing and/or adaptive voice noise reduction processing.

In an embodiment, the masking sound generation module 1103 is configured to perform time domain inversion processing on the voice signal, to generate the masking sound.

In an embodiment, the masking sound generation module 1103 is configured to:

obtain noise data in a noise database, and generate the masking sound by using the noise data, or generate the masking sound by using the voice signal and the noise data. The noise data in the noise database may be preset.

In an embodiment, the masking sound generation module 1103 is configured to obtain the noise data in the noise database, and the masking sound generation module 1103 is configured to: analyze a voice feature of the voice signal, and obtain, from the noise database, the noise data corresponding to the voice feature.

In an embodiment, the masking sound post-processing module 1104 is further configured to perform automatic gain control adjustment on the masking sound before outputting the masking sound to the first speaker at the voice source location and the second speaker at the target masking location, so that a volume of the masking sound falls within a specified range.

In an embodiment, the masking sound post-processing module 1104 is configured to:

perform sound field control processing on the masking sound based on the voice source location and the target masking location to output a first masking sound and a second masking sound, where the sound field control processing includes adjusting a phase and an amplitude of each frequency signal in the masking sound; and output the first masking sound to the first speaker at the voice source location, and output the second masking sound to the second speaker at the target masking location.

In an embodiment, the performing sound field control processing on the masking sound based on the voice source location and the target masking location to output a first masking sound and a second masking sound includes:

performing sound field control processing on the masking sound based on the voice source location and the target masking location to output masking sounds of N channels, where the masking sounds of the N channels include the first masking sound and the second masking sound, and N is a quantity of speakers in a cockpit.

In an embodiment, the masking sound received by the first speaker at the voice source location is lower than the masking sound received by the second speaker at the masking location.

In an embodiment, when the target masking location is a driver seat, the second speaker includes a speaker located at a headrest of the driver seat.

In an embodiment, when the target masking location includes the driver seat, the masking sound post-processing module 1104 is further configured to increase a volume of a vehicle safety alarm sound.

In an embodiment, when the target masking location includes the driver seat, the masking sound post-processing module 1104 is further configured to: obtain an outside-vehicle sound, perform specific type identification on the outside-vehicle sound to identify a specific sound in the outside-vehicle sound, and output the specific sound to the speaker in the driver seat.

In an embodiment, the location determining module 1101 may further receive a voice masking deactivation instruction, and transmit the deactivation instruction to the voice detection module 1102. The voice detection module 1102 is further configured to stop, based on the deactivation instruction, receiving the sound signal from the voice source location.

In an embodiment, the location determining module 1101 may further directly control the voice detection module based on the deactivation instruction, so that the voice detection module stops receiving the sound signal at the voice source location.

In an embodiment, the voice detection module may be configured to: directly receive the voice masking deactivation instruction, and stop, based on the deactivation instruction, receiving the sound signal at the voice source location.

It should be understood that, in the several embodiments provided in this application, the disclosed apparatus and method may be implemented in other manners. For example, the described apparatus embodiment is merely an example. For example, division into the units, components, or modules is merely logical function division and there may be another division manner in an actual implementation. For example, a plurality of units, components, or modules may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located at one location, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

An embodiment of this application further provides another voice masking apparatus 1200. The voice masking apparatus 1200 shown in FIG. 12 may be an implementation of a hardware circuit of the apparatus shown in FIG. 11, and is used in flowcharts shown in FIG. 4, FIG. 6, FIG. 7A, FIG. 7B, FIG. 7C, and FIG. 10 to perform functions in the foregoing method embodiments.

As shown in FIG. 12, the voice masking apparatus 1200 includes at least one processor 1201. The at least one processor 1201 may be a general-purpose central processing unit (CPU), a microprocessor, an application-specific integrated circuit (ASIC), or one or more integrated circuits, and is configured to execute a related program to implement the voice masking method in the method embodiments of this application.

The processor 1201 may alternatively be an integrated circuit chip and has a signal processing capability. In an implementation process, the steps of the voice masking method in this application may be implemented through a hardware logic circuit in the processor 1201, or instructions in a form of software.

The voice masking apparatus 1200 may further include at least one memory 1202, and the memory 1202 is configured to store instructions and/or data. The processor 1201 may be configured to execute the instructions stored in the memory 1202. The memory 1202 may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM). Through example but not limitative description, the RAM may have many forms, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be understood that the memory in embodiments of this application may be a volatile memory or a nonvolatile memory, or may include both a volatile memory and a nonvolatile memory. It should be noted that the memory of the systems and methods described in this specification includes but is not limited to these and any memory of another proper type.

It should be noted that although only the memory and the processor are shown in the voice masking apparatus 1200, in a specific implementation process, a person skilled in the art should understand that the voice masking apparatus 1200 may further include another component required for implementing normal running, for example, a power supply, a communication port, or an input/output device.

An embodiment of this application further provides a voice masking system 200. The voice masking system 200 may include the control apparatus 210, the microphone apparatus 220, and the speaker apparatus 230 shown in FIG. 2. The control apparatus 210 may be the voice masking apparatus 1100 or 1200 in the foregoing embodiments. The microphone apparatus 220 may include a microphone deployed at a voice source location, and is configured to capture a sound signal at the voice source location. The speaker apparatus 230 may include a first speaker deployed at the voice source location and a second speaker deployed at a target masking location, and is configured to play a masking sound.

In an embodiment, the voice masking system 200 may further include the interaction apparatus 240 shown in FIG. 2, and the interaction apparatus may include the function activation/deactivation apparatus 243. The function activation/deactivation apparatus 243 may include a voice masking function activation/deactivation apparatus, and the voice masking function activation/deactivation apparatus is configured to control activation and/or deactivation of a voice masking function.

In an embodiment, the interaction apparatus 240 may further include the sensor apparatus 241 shown in FIG. 2. The sensor apparatus 241 may include one or more of an image sensor, a radar sensor, and a seat sensor, and is configured to collect information about an occupant in a vehicle. For example, the image sensor includes a camera, and an image is transmitted to the control apparatus 210 based on the image of the occupant in the vehicle captured by the camera. The control apparatus 210 obtains the voice source location and/or the target masking location through identification based on the image.

In an embodiment, the interaction apparatus 240 further includes an information input apparatus, and the information input apparatus is configured to input the voice source location and/or the target masking location by the occupant in the vehicle. The information input apparatus may be the display apparatus 242 shown in FIG. 2, or may be a physical button type input apparatus, or may be a terminal device. The terminal device may be a mobile phone, a tablet, a watch, or the like. The terminal device may directly or indirectly interact with the control apparatus 210 through Wi-Fi, Bluetooth, a mobile network, or the like. It should be understood that the terminal device is not limited in this application, and an interaction manner between the terminal device and the control apparatus 210 is not limited either.

In an embodiment, the microphone apparatus 220 may further include one or more microphones deployed outside the vehicle, and the microphone is configured to capture an outside-vehicle sound signal.

An embodiment of this application further provides a computer-readable storage medium, configured to store a computer program, and when the computer program is run on a computer, the computer is enabled to perform the voice masking method.

An embodiment of this application further provides a computer program product, including computer program code, and when the computer program code is run on a computer, the computer is enabled to perform the voice masking method.

An embodiment of this application further provides a vehicle, and the vehicle includes any apparatus of the voice masking apparatus 1100 and the voice masking apparatus 1200, or the voice masking system 200.

A person of ordinary skill in the art may be aware that, with reference to examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A specific term "example" herein means "used as an example, embodiment or illustration". Any embodiment described as "example" is not necessarily explained as being superior or better than other embodiments.

It should be understood that sequence numbers of processes do not mean execution sequences in embodiments of this application. The execution sequences of the processes shall be determined based on functions and internal logic of the processes, and shall not be construed as any limitation on the implementation processes of embodiments of this application.

It should be understood that determining B based on A does not mean that B is determined based on only A, and B may alternatively be determined based on A and/or other information.

Terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network like the Internet interacting with other systems by using the signal).

Related parts between the method embodiments of this application may be mutually referenced; and apparatuses provided in the apparatus embodiments are configured to perform the methods provided in corresponding method embodiments. Therefore, the apparatus embodiments may be understood with reference to related parts in the related method embodiments.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A voice masking method performed by a vehicle, comprising:

determining a voice source location and a target masking location;

receiving a sound signal from the voice source location;

detecting whether a voice signal exists in the sound signal to generate a detection result; and if the detection result is that the voice signal exists in the sound signal:

generating a masking sound for the voice signal; and outputting the masking sound to a second speaker at the target masking location;

wherein the generating a masking sound for the voice signal comprises: generating the masking sound by performing time domain inversion processing on the voice signal;

or wherein the generating a masking sound for the voice signal comprises:

analyzing a voice feature of the voice signal, and obtaining the noise data, from the noise database, corresponding to the voice feature;

generating the masking sound based on the noise data, or the voice signal and the noise data.

2. The method according to claim 1, further comprising:

before the determining the voice source location and the target masking location, receiving a voice masking activation instruction; and wherein the determining the voice source location and the target masking location comprises:

determining the voice source location based on a source location of the activation instruction; and determining the target masking location based on occupant information obtained by a sensor in the vehicle.

3. The method according to claim 2, further comprising:

receiving a voice masking deactivation instruction; and stopping, based on the deactivation instruction, receiving the sound signal at the voice source location.

4. The method according to claim 1, wherein the voice source location and the target masking location are input by an occupant in the vehicle.

5. The method according to claim 1, wherein after the receiving the sound signal from the voice source location, the method further comprises:

performing enhancement processing on the sound signal.

6. The method according to claim 5, wherein the enhancement processing comprises at least one of echo cancellation processing or adaptive voice noise reduction processing.

7. The method according to claim 1, further comprising:

generating a second masking sound and outputting the second masking sound to the second speaker at the target masking location;

or generating a first masking sound and outputting the first masking sound to a first speaker at the voice source location;

or generating a first masking sound and a second masking sound, and outputting the first masking sound to a first speaker at the voice source location and outputting the second masking sound to the second speaker at the target masking location, wherein a volume of the first masking sound is lower than the second masking sound;

or generating a first masking sound and a second masking sound, and outputting the first masking sound to a first speaker at the voice source location and outputting the second masking sound to the second speaker at the target masking location, wherein the masking sound played by the first speaker at the voice source location is used to cancel the masking sound received at a target source location from the second speaker.

8. The method according to claim 7, wherein the outputting the first masking sound to the first speaker at the voice source location and the second masking sound to the second speaker at the target masking location comprises:

performing sound field control processing on the first masking sound and the second masking sound based on the voice source location and the target masking location to output the first masking sound and the second masking sound, wherein the sound field control processing comprises adjusting a phase or an amplitude of each frequency signal in the first masking sound and the second masking sound; and outputting the first masking sound to the first speaker at the voice source location, and outputting the second masking sound to the second speaker at the target masking location.

9. The method according to claim 8, wherein the performing sound field control processing comprises:

performing sound field control processing on the first masking sound and the second masking sound based on the voice source location and the target masking location to output masking sounds of N channels, wherein the masking sounds of the N channels comprise the first masking sound and the second masking sound, and N is a quantity of speakers in a cockpit, wherein a volume of a masking sound received by the first speaker is lower than a volume of a masking sound received by the second speaker.

10. The method according to claim 8, wherein when the target masking location comprises a driver seat, the second speaker comprises a speaker located at a headrest of the driver seat.

11. The method according to claim 1, wherein before the outputting the masking sound to the second speaker at the target masking location, the method further comprises: performing automatic gain control adjustment on the masking sound, so that a volume of the masking sound falls within a specified range.

12. The method according to claim 1, wherein when the target masking location comprises a driver seat, the method further comprises: increasing a volume of a vehicle safety alarm sound.

13. The method according to claim 12, further comprising:

obtaining an outside-vehicle sound, performing specific type identification on the outside-vehicle sound to identify a specific sound in the outside-vehicle sound; and outputting the specific sound to a speaker in the driver seat.

14. A voice masking apparatus, comprising at least one processor and a memory, wherein the memory stores instructions for execution by the at least one processor to perform operations comprising:

determining a voice source location and a target masking location;

receiving a sound signal from the voice source location;

detecting whether a voice signal exists in the sound signal to generate a detection result; and if the detection result is that the voice signal exists in the sound signal;

generating a masking sound for the voice signal; and outputting the masking sound to a second speaker at the target masking location;

wherein the generating a masking sound for the voice signal comprises: generating the masking sound by performing time domain inversion processing on the voice signal;

or wherein the generating a masking sound for the voice signal comprises:

analyzing a voice feature of the voice signal, and obtaining the noise data, from the noise database, corresponding to the voice feature;

generating the masking sound based on the noise data, or the voice signal and the noise data.

15. The voice masking apparatus according to claim 14, the operations further comprising:

before the determining the voice source location and the target masking location, receiving a voice masking activation instruction; and wherein the determining the voice source location and the target masking location comprises:

determining the voice source location based on a source location of the activation instruction; and determining the target masking location based on occupant information obtained by a sensor in a vehicle.

16. The voice masking apparatus according to claim 14, wherein the voice source location and the target masking location are input by an occupant in a vehicle.

17. The voice masking apparatus according to claim 14, wherein after the receiving the sound signal from the voice source location, the operations further comprising:

performing enhancement processing on the sound signal.

18. A non-transitory computer-readable storage medium, comprising instructions, wherein when the instructions are executed on a computer, the computer is enabled to perform operations comprising:

determining a voice source location and a target masking location;

receiving a sound signal from the voice source location;

detecting whether a voice signal exists in the sound signal to generate a detection result; and if the detection result is that the voice signal exists in the sound signal:

generating a masking sound for the voice signal; and outputting the masking sound to a second speaker at the target masking location;

wherein the generating a masking sound for the voice signal comprises: generating the masking sound by performing time domain inversion processing on the voice signal;

or wherein the generating a masking sound for the voice signal comprises:

analyzing a voice feature of the voice signal, and obtaining the noise data, from the noise database, corresponding to the voice feature;

generating the masking sound based on the noise data, or the voice signal and the noise data.

19. A voice masking apparatus, comprising at least one processor and a memory, wherein the memory stores instructions for execution by the at least one processor to perform operations comprising:

determining a voice source location and a target masking location;

receiving a sound signal from the voice source location;

detecting whether a voice signal exists in the sound signal to generate a detection result; and if the detection result is that the voice signal exists in the sound signal;

generating a masking sound for the voice signal;

outputting the masking sound to a second speaker at the target masking location; and increasing a volume of a vehicle safety alarm sound.

20. A voice masking apparatus, comprising at least one processor and a memory, wherein the memory stores instructions for execution by the at least one processor to perform operations comprising:

determining a voice source location and a target masking location;

receiving a sound signal from the voice source location;

detecting whether a voice signal exists in the sound signal to generate a detection result; and if the detection result is that the voice signal exists in the sound signal:

generating a masking sound for the voice signal; and outputting the masking sound to a second speaker at the target masking location;

obtaining an outside-vehicle sound;

performing specific type identification on the outside-vehicle sound to identify a specific sound in the outside-vehicle sound; and outputting the specific sound to the speaker in a driver seat.

* * * * *